Figure 1:
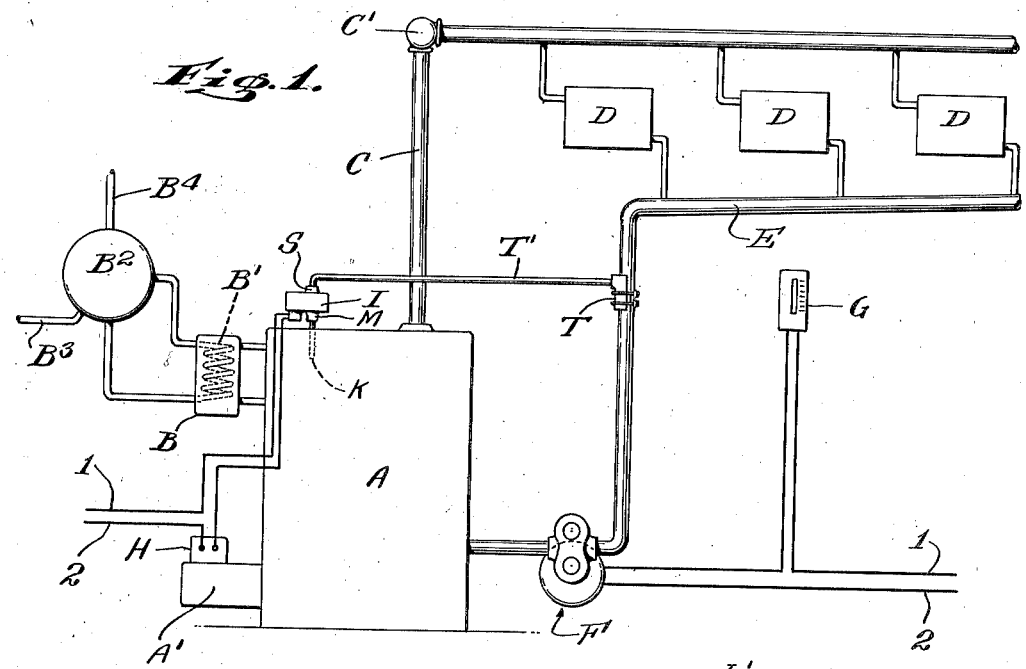

March 18, 1941.    W. W. TIMMIS    2,235,692
HOT WATER HEATING SYSTEM
Filed Oct. 9, 1939

INVENTOR
WILLIAM WALTER TIMMIS
BY
John E. Hubbell
ATTORNEY

Patented Mar. 18, 1941

2,235,692

UNITED STATES PATENT OFFICE 2,235,692

HOT WATER HEATING SYSTEM

William Walter Timmis, Pleasantville, N. Y., assignor to Herske & Timmis, New York, N. Y., a corporation of New York Application October 9, 1939, Serial No. 298,536

8 Claims. (Cl. 236—1)

The present invention relates to hot water heating systems, and particularly to that type of hot water heating system, now in extensive use for house or building heating purposes in which means are provided for maintaining the heater at a fixed temperature, which during much of the time is appreciably higher than that maintained in the radiators, in order that the heater may serve the added function of suitably heating domestic hot water at all times, regardless of whether the demand for building heating requires the radiators to be at a temperature sufficiently high to heat domestic water or not.

Known systems of the type above mentioned, take various forms, each, however, including provisions for preventing or restricting circulation of hot water from the heater to the radiators, except at such times and of such amounts as may be required for building heating. In particular, such a system may be a gravity circulation system, in which case the circulation through the radiators may be regulated by adjustment of a hand valve, or more usually, by means of a motor valve automatically controlled by a so-called room thermostat; or, such a system may include a circulation pump and a check valve cooperating to make the circulation through the radiators directly dependent on the operation of the circulation pump, which may be controlled manually or by a room thermostat.

The primary object of the present invention is to provide a novel, simple and effective method of and means for regulating the operation of a heating system of the above mentioned type. More specifically, the invention has for its object to provide simple and effective means for operating the oil or gas burner, stoker or other heating element of the water heater of a system of the above mentioned type, as required to properly serve the two heating requirements to which such a heating system is frequently subjected.

One of those requirements is the maintenance of the water in the heater of a temperature not lower than a certain minimum temperature needed to permit the satisfactory use of the heater in heating water used for domestic purposes, as well as to simultaneously supply heated water to the heating systems of radiators as required for their heating purposes. Ordinarily the minimum heater water temperature required for domestic hot water supply purposes will be in the range of 140°–160° F. The second of said requirements, is that the heater should supply water to the radiators during cold weather periods at a temperature which is substantially above the said temperature range required for the satisfactory supply of hot water for domestic purposes, although the radiator demand for heat under more moderate outdoor temperature conditions would be satisfied with a heater water temperature lower than 140° F.

While the water temperature range of 140°–160° F., which is satisfactory in respect to the supply of hot water for domestic purposes, will ordinarily be ample or more than ample to meet the radiator heat requirements under moderate or warm weather conditions, hot water heating systems are now frequently installed in which radiator bulk and construction cost are minimized by the use of radiators so small that they can supply the anticipated maximum demand for heat, experienced during spells of very cold weather, only if the average temperature of the water in the radiators is substantially in excess of the above mentioned temperature range. To meet the maximum heat requirements with such a system frequently requires that the water passing from the heater to the radiators shall be at a temperature of 200° F., and in some cases at a temperature as high as 220° F. or higher.

The objection to the previously available means for regulating the temperature of the water in the heater is that the thermostatic means responsive to the water heater temperature must either be set at a point high enough to satisfy the maximum demand for building heating, in which case it is substantially higher than required for building heating under average weather conditions, and for heating domestic hot water, thus resulting in waste of fuel and overheating of domestic hot water, or it must be set at a point as required for domestic hot water, in which case the temperature of the water in the heater will not be high enough to satisfy the maximum demand for building heating.

In the preferred mode of carrying out the present invention, the rate at which heat is supplied to the heater is so regulated as to maintain either an approximately constant heater water temperature or an approximately constant difference between the temperature at which the water passes from the heater to the radiators and the temperature at which the water returns from the radiators to the heater, accordingly as the latter temperature is or is not below a predetermined temperature, return water temperature during periods in which the radiators are producing their maximum practical heating effects. The maintenance of a suitable and substantially constant differential, which ordinarily may well be about 20° F., between the water supply and return temperatures when the radiator heat requirement is relatively large, coupled with such regulation of the rate of water circulation through the radiators as is required to satisfy the demand for heat, insures maximum heating capacity, coupled with efficient operation at times when the heating load is heavy and efficiency in operation is most important.

In the preferred practical mode of carrying out the present invention, I regulate the water circulation by means of a so-called room thermostat, or analogous controlling device, which varies the operation of a water circulating pump in accordance with the temperature of a room or space, heated by one or more of the radiators of the system and I regulate the supply of heat to the heater by regulating means consisting essentially of the combination including a well known form of thermostatic regulating means responsive to the heater water temperature, now employed in a regulator which is known as the "aqua-stat," and is used to maintain an approximately constant heater temperature, so combined with means responsive to the return water temperature, that the combination will keep the heater water temperature approximately constant, or will vary that temperature as required to keep it in excess of the return water temperature by an approximately constant amount, accordingly as the return water temperature does or does not exceed a predetermined and relatively low value.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described a preferred embodiment of the invention.

Figure 2:
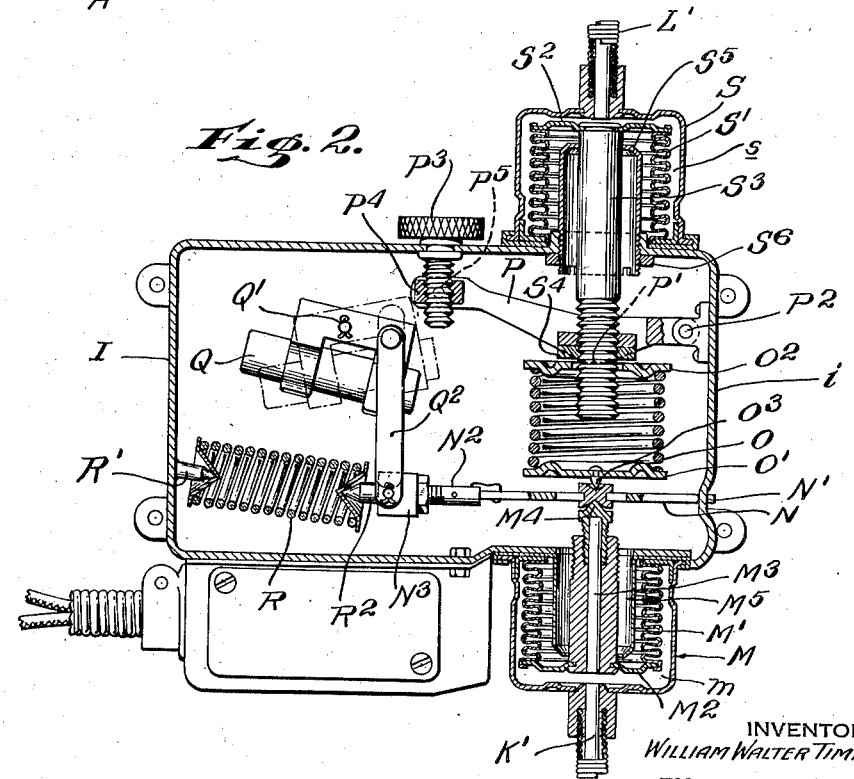

Fig. 1 is a diagrammatic representation of a hot water heating system including an embodiment of the present invention; and Fig. 2 is an elevation in section of a water heater temperature controller included in the system shown in Fig. 1.

The heating system shown in the drawing comprises a water heater A of well known type, and having a water container and a regulable heating element A', such as an oil or gas burner, or an automatic stoker. The heater A delivers hot water through a supply pipe or main C including a non-return valve C', to the inlets of one or more radiators D. Each of the latter has its water outlet connected to a return pipe or main E. The latter is connected to the return water inlet of the heater A through a motor driven circulating pump F.

The heater A is also employed to supply hot water for domestic use. To this end, a small tank B has its upper end connected to the water space or container of the heater A at an upper level, and has its lower end connected to said water space at a lower level. A water heating pipe B' in the tank B, has its upper and lower ends connected at upper and lower levels to a domestic hot water storage tank B². The latter is connected to a water supply main or other source of water under suitable pressure, by an inlet pipe B³, and delivers hot water through a delivery or service pipe B⁴.

As diagrammatically illustrated, the circulating pump F is automatically started and stopped on predetermined decreases and increases, respectively, in the temperature to which a thermostatic controller G is subjected. The latter ordinarily will be a so-called room thermostat, employed to regulate the temperature in some room or space to which one or more of the radiators D supply heat, and operating on increases and decreases in said temperature to close and open an energizing circuit for the driving motor for the pump F. In so far as it has already been described, the system shown diagrammatically in Fig. 1, includes nothing now novel with me, but on the contrary, is a typical system of the kind with which my invention may be employed with advantage.

The rate at which the heating element A' supplies heat to the water space of the heater A, is regulated by an electrical regulator H, which may be an electric motor or an electromagnetic switch or valve, and which is actuated by the energization and deenergization of a control circuit, to maintain the desired water temperature in the heater A. The energization and deenergization of said control circuit is automatically effected in accordance with the present invention, by a controller I which under certain conditions, is automatically responsive to the temperature of the water in the heater A, and under other conditions is automatically responsive to the differential of the heater water temperature and the temperature at which water is returned to the heater through the return pipe E.

The regulator I in one form suitable for its intended purposes, is illustrated in section in Fig. 2, and comprises a fluid pressure responsive element M. The element M includes a casing element in the form of a rigid cup-shaped shell having its rim portion detachably secured to the bottom wall of the housing $i$ of the regulator I, at the margin of an opening in said wall. Said casing element surrounds, but is not filled by an expansible bellows element M'. The latter has its upper end rigidly connected to the rim of the casing element, and has its lower and movable end connected to and closed by a rigid end head M². The bellows element M', its head M², and the cup-shaped casing, form the walls of an expansible pressure chamber $m$, to which a pressure varying with the temperature of the water in the heater A, is transmitted by a pipe K', from a thermometer bulb K, immersed in the water in the heater A and containing a vaporizable liquid. The tendency of the pressure within the expensible chamber $m$ to collapse the bellows M', is opposed by a loading force transmitted to the movable bellows end head M² through a stem member M³. The latter is connected to its lower end to the end member M², and extends axially upward through the bellows and has a thrust or bearing element M⁴ adjustably secured to its upper end. A hollow member M⁵ within and secured to the upper end of the casing of the element M, forms an abutment, which is engaged by the end head M² after a predetermined up movement of the latter and thereby prevents excessive contraction of the bellows M'.

The element M acts through the thrust member M⁴ carried at the upper end of its stem M³, on a lever N which extends across the axis of the element M and has one end pivoted at N' to the housing I. The up thrust of the member M⁴ on the lever N is opposed by a resilient loading force directly due to the tension of a helical spring O, the axis of which is in alignment with the stem M³ and which is normally compressed, more or less, between the lower and upper abutment members O' and O², respectively. The lower abutment member O' is shown as a metal disc provided at its underside with a central bearing pivot or thrust part O³, coaxial with the bearing part M⁴ and engaging the lever N at its upper side.

The upper abutment member O² is shown as in the form of a metal annulus, the upper side of which is adapted under certain conditions to engage and bear against shoulders P' of a manually adjustable part P. The latter is in the form of a lever bifurcated to provide spaced apart arms, shaped to form the shoulders P' which engage the annular member O² at diametrically opposed points. The lever P is pivotally connected at P² to the housing $i$, and is connected at its other end to an adjusting screw P³ journalled in the top wall of said housing, and provided externally of the latter with an operating head or knob for rotating the screw. The inner threaded portion of the screw P³ is in threaded engagement with a nut P⁴ pivotally connected by horizontal trunnion pivots P⁵ to the lever P. Rotation of the screw P³ in one direction or the other will thus raise or lower the level at which the abutment O² will engage and bear against the lever P.

The bellows element M' elongates or contracts in response to increases or decreases in the fluid pressure within the space $m$ under certain conditions, and under other conditions, it elongates in response to variations in the differential, or resultant of the pressure in the space $m$ and the loading force impressed on the bellows M' through the spring abutment O'. However produced, an increase in the length of the bellows M' adjusts a controlling element Q to thereby interrupt or diminish the supply of heat to the heater A, and a decrease in the length of the bellows effects an adjustment of the element Q which initiates or increases the supply of heat to the heater A. As shown, the controlling element Q is a mercury switch, pivoted to be turned about a supporting pivot Q' between open and closed positions, as the element M' elongates or contracts, by a link Q² pivotally connected at one end to the switch Q, and pivotally connected at its other end to the lever N.

As shown in dotted lines in Fig. 2, the switch Q is in its closed position corresponding to the minimum operative length of the element M', and closes an electric energizing circuit for the regulator H, with the result that the heating element A' then supplies heat to the heater A. On the expansion of the bellows M' to its maximum operative length, the switch Q is turned into its full line position, thereby opening the energizing circuit for the regulator H, and interrupting the supply of heat to the heater A by the element A'.

As shown, the operating means for the switch Q, include known provisions for causing the switch to open and close with a snap action. Those provisions comprise a coil spring R compressed between a stationary abutment R' within the housing $i$, and a second abutment in the form of a conical thrust part R² carried by the lever N at its end remote from the pivot N'. The abutment R' is so positioned with respect to other portions of the regulator, that the part R² will be below the line connecting the pivot N' and the abutment R' when the switch is in its open position shown in full lines in Fig. 2, and will be above that line when the switch is in its closed position, shown in dotted lines. The spring R thus opposes the initial portion, and assists and expedites the final portion of each angular movement of the lever N, required to adjust the switch Q from either of its two positions into the other position.

The temperature of the water in the heater at which the pressure in the space $m$ is low enough to permit the switch Q to snap from its dotted line position into its closed line position, will be lower than the heater water temperature required to produce the pressure in the space $m$ needed to move the switch from its full line position into its dotted line position, assuming that the loading force impressed on the lever N by the spring O, is the same in each case. Heat to the heater is thus cut off or reduced, and the time at which the supply of heat is again initiated or increased, is commonly referred to as the "operating differential." Such an operating differential, if of suitable extent, is practically desirable, not only because of the resultant switch snap action, but also because it eliminates unnecessary and objectionable rapid actuations of the regulator H alternately in opposite directions, which would otherwise be effected under certain operating conditions. The extent or magnitude of the operating differential may be adjusted with the apparatus shown, by the rotation of a threaded part N² mounted on the body portion of the lever N to turn about its own axis, and in threaded engagement with a nut N³ which carries the thrust part R². The rotation of the threaded part N² moves the nut N³ toward or away from the pivot N', depending upon the direction of rotation, and thereby varies the effective length of the lever N and the tension of the spring R.

Except in respect to the form of the means employed for manually adjusting the tension of the loading spring O, the regulator I is shown as similar in construction and operation to a water heater regulator now in extensive use and commercially known as an "aqua-stat." That regulator includes means responsive to the temperature of the water in a water heater and operates to maintain said temperature approximately constant, or, more accurately, within a small normal range of variation. For the purposes of the present invention, the regulator I is employed to regulate the temperature in the water heater just as it has been regulated heretofore during periods in which the radiator demand for heat is not great enough to require operation with a return water temperature above a certain predetermined temperature substantially below the maximum return but includes in combination with the operative elements of the "aqua-stat" means through which it increases the heat supply to the heater A as required to increase the heater water temperature in a predetermined manner as the radiator demand for heat increases above a certain minimum value substantially below the maximum demand which the system is adapted to supply.

In the form illustrated, the means by which the regulator I is automatically actuated to increase the heater water temperature as the radiator demand for heat increases above a certain minimum, comprises means through which the upper spring abutment O² is moved downward from its position of engagement with the lever P, on, and in accordance with, an increase in the temperature of the heating system return pipe E.

As shown, the means through which the upper spring abutment member O² is moved downward out of engagement with the lever shoulders P', on an increase in the return water temperature, comprises a fluid pressure expansible element S coaxial with, and generally similar in construction to the element M. The casing of the element S is in the form of an inverted cup, and is mounted on the top wall of the housing $i$, and surrounds an expansible bellows S', which has its lower end rigidly connected to the casing rim portion. An end head $S^2$ rigidly secured to the upper end of the bellows S', unites with the latter and the casing of the element S to form the walls of a pressure fluid receiving space $s$. The end head $S^2$ supports a depending stem $S^3$ which extends downward through the annular abutment $O^2$. The lower portion of the stem $S^3$ is threaded, and nuts $S^4$ threaded, and adjustably locked, on the threaded portion of the stem $S^3$, engage and depress the abutment member $O^2$ when the bellows S' contracts in length. As shown, the down movement of the closed end of the bellows S' is limited by a stop member $S^5$, which as shown is an elongated inverted cup having an opening in its end wall through which the stem $S^3$ loosely extends, and having an externally threaded lower portion in threaded engagement with the wall of an opening in the top wall of the housing $i$. The minimum length of the bellows S' may be varied by rotation of the stop member $S^5$, which may be secured in its adjusted position by a lock nut $S^6$.

The pressure within the pressure chamber $s$ of the element S, is made dependent on the temperature of the water passing from the radiators to the pump F and heater A by means comprising a fluid pressure thermometer T, which as shown has its bulb portion secured to, and in suitably good heat conducting relation with, a portion of the return pipe E between the radiators and the the pump F, and having its bulb space connected to the space $s$ by a pipe or tube T'.

In operation the apparatus shown in the drawing will tend to maintain a water temperature in the heater during periods in which the spring abutment $O^2$ engages the lever P which may properly be referred to as approximately constant, though it actually varies through the small operating differential range between the temperature at which the pressure in the space $m$ of the element M is high enough to cause the lever N to snap up out of its lower switch closing position, and the slightly lower temperature at which the reduction of the pressure in space $m$ will permit the spring O to snap the lever N back into its switch closing position. The heater water temperature range which the apparatus thus tends to maintain while the abutment $O^2$ engages the lever P, may be varied by rotating the screw $P^3$ to raise or lower the lever shoulders P' and thereby decrease or increase the tension of the spring O acting on the lever N in opposition to the pressure in the space $m$.

The abutment $O^2$ will be held in engagement with the lever P by the tension of the spring O so long as the return water temperature to which the bulb T responds is too low to create a pressure in the space $s$ of the element S, subjecting the abutment $O^2$ to a down pressure greater than the tension of the spring O. The return water temperature at which the element S becomes practically operative, so as to move the abutment $O^2$ out of engagement with the lever P, will be less than the minimum heater water temperature which the element M tends to maintain, by an amount or differential which may be varied by screwing the lock nuts $S^4$ up or down on the stem $S^3$.

On an increase in the return water temperature above the minimum value required to make the element S operative for heater regulation purposes, the increased down thrust exerted by the bellows S' on the abutment $O^2$ tends to maintain the switch Q closed and thereby to increase the temperature to which the water is heated until the heater water temperature rises above its value maintained when the element S is not practically operative, by an amount corresponding to the difference between the actual return water temperature and minimum return water temperature value at which the element S becomes practically operative.

Ordinarily I consider it desirable to have the diameters of the bellows M' and S', so proportioned, and to so charge each of the thermometric devices respectively including those bellows, with expansible fluid that the controller I, will tend to maintain a constant differential between the heater water temperature and the return water temperature during the periods in which the return water temperature is high enough to bring the element S into operation. For the intended control action, it is essential that the upward thrust on the lever N due to the pressure in the space $m$ should be a resilient or elastic force, which will yield to and permit down movement of the lever under the down thrust of the spring O, when the temperature conditions are such that the switch Q should be adjusted from its dotted line position into its full line position. With the construction shown, the elastic character of the force acting upwardly on the lever N is obtained by vapor or gas charging the thermometric device including the bulb K, so that it is unnecessary to interpose a spring in the thrust connection between the bellows end wall $M^2$ and the lever N, or otherwise mechanically modify the controller I, as would be necessary if said thermometric device were liquid charged, i. e., charged with a liquid which does not volatilize under operating conditions. With the construction shown, however, the thermometric device including the bulb T may advantageously be liquid charged.

In the intended operation of the heating system shown, the temperature at which water is returned from the radiators to the heater A depends essentially upon three factors, namely: the temperature at which water is moved by the pump F from the heater A into the radiators; the rate at which heat is dissipated by, or absorbed from, the radiators D, and the supply and return piping C and E; and the rate at which water is moved by the pump F away from the heater, through the radiator and back to the heater. The non-return valve C' serves, as is customary in such systems, to prevent any significant increase of radiator temperature due to convection current circulation, as distinguished from the circulation effected by the pump F.

While it is theoretically possible to provide for a normally continuous operation of the pump F at a speed varied manually or automatically, as by the room thermostat G, in accordance with the radiator heating effect needed, in practice the pump F is operated intermittently and at approximately constant speed, and the average rate of water circulation through the radiators is varied by varying the frequency, or the duration, or more usually, by varying both the frequency and duration of the operating periods. With any particular heater water temperature, the maximum radiator heating effect theoretically obtainable, requires a circulation through the radiators at a rate rapid enough to avoid any significant difference between the temperatures at which the water enters and leaves the radiators. In practice, there must be an appreciable difference between those temperatures to avoid excessive pump energy consumption and for other practical resons, and the temperature difference which the controller I tends to maintain, during the periods in which it operates to control that difference, may well be of the order of 10 to 20° F.

The present invention provides a simple and effective automatic control for a hot water heating system in which the radiators are too small to give the heating effect needed under extreme weather conditions, unless the heater water temperature is then substantially higher than it needs to be to supply suitably hot water for domestic use through the auxiliary heater or heat exchanger B, and to satisfy the existing radiator demand for heat under moderate weather conditions. Operation to produce a heater water temperature higher than is needed to supply hot water and to satisfy the existing need for radiator heat is uneconomical and undesirable.

When the radiator heat effect required is small, so that the pump F is in operation only during short and infrequent intervals, the water temperature in the radiators and return piping will normally be but little above room temperature. As the outside temperature falls and the need for radiator heat progressively increases, the operation of the pump F during longer and more frequent intervals, progressively increases the average water temperature in the radiators and return piping. The increase in return water temperature does not modify the tendency of the controller I to maintain a constant heater water temperature, however, until it produces sufficient contraction of the bellows S' to move the spring abutment O² out of engagement with the lever P. The temperature at which the return water thus begins to modify the action of the controller I, may be varied by adjustment of the screw P³.

After the return water temperature becomes high enough to hold the abutment O² away from the lever P, a change in that temperature tends to produce a corresponding change in the heater water temperature which the controller I tends to maintain, until the return water temperature becomes high enough to effect movement of the bellows end wall S² into engagement with the stop S⁵. Until the return water cools below the last mentioned temperature, the controller I tends to maintain the heater water temperature constant at the value corresponding to the return water temperature at which the contraction of the bellows S' is interrupted by the stop S⁵. The stop S⁵ thus serves as an adjustable safety device limiting the maximum heater water temperature.

In the normal operation of a heating system of the character illustrated, and particularly when the circulating pump is being operated during a sufficient portion of the time to make the return water temperature high enough to operatively affect the controller I, there will be a fairly definite relation, and no great difference, between the average radiator water temperature and the temperature in the return piping E at any point along the length of the latter. In consequence, while it is convenient to secure the thermometer bulb T against a portion of the return piping adjacent the heater, for the general purpose of the present invention, the bulb T may be associated with the return piping E at practically any point along the length of the latter, or may be associated with one of the radiators D.

While in accordance with the provisions of the statutes, I have illustrated and described the best forms of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is:

1. In the operation of a hot water heating system comprising a water heater, radiators and means for passing water from the heater to the radiators and back to the heater at a rate which may be varied to vary the radiator heating effect, the method which consists in regulating the heater by and in accordance with the temperature to which the water is heated during periods in which the temperature at which the water is returned from the radiators to the heaters is relatively low, and regulating the heater by and in accordance with the differential of the two temperatures when the second mentioned temperature is relatively high.

2. In the operation of a hot water heating system including a water heater, radiators, and means for passing water from the heater to the radiators and back to the heater at a rate which may be varied to vary the radiator heating effect, the method which consists in regulating the heater during periods in which the temperature at which water passes from the radiators back to the heater is below a predetermined value by and in accordance with variations in the temperature to which the water is heated, so as to maintain the last mentioned temperature approximately constant, and in regulating the heater during periods in which the first mentioned temperature exceeds said value, by and in accordance with variations in the two temperatures and so as to increase the heater temperature in a predetermined manner as the second mentioned temperature increases.

3. In the operation of a hot water heating system including a water heater, radiators, and means for passing water from the heater to the radiators and back to the heater at a rate which may be varied to vary the radiator heating effect, the method which consists in regulating the heater during periods in which the temperature at which water passes from the radiators back to the heater is below a predetermined value and in accordance with variations in the temperature to which the water is heated so as to maintain the last mentioned temperature approximately constant and in regulating the heater during periods in which the first mentioned temperature exceeds said value on and in accordance with variations in the two temperatures and so as to maintain a predetermined difference between the two temperatures as the second mentioned temperature varies.

4. In a hot water heating system, the combination of radiators, a regulable water heater, means for passing water from the heater to the radiators and back to the heater at a rate which may be increased to increase the radiator heating effect, heater regulating means responsive to the heater water temperature and tending to maintain that temperature approximately constant, and means responsive to the temperature at which water passes back to the heater from the radiators operative to modify the action of said regulating means so as to increase or decrease the temperature to which the water is heated in accordance with an increase or decrease in the temperature at which the water passes back to the heater.

5. In a hot water heating system, the combination of radiators, a regulable water heater, means for passing water from the heater to the radiators and back to the heater at a rate which may be increased to increase the radiator heating effect, heater regulating means responsive to the heater water temperature and tending to maintain that temperature approximately constant, means responsive to the temperature at which water passes back to the heater from the radiators operative, when the last mentioned temperature exceeds a predetermined temperature, to modify the action of said regulating means so as to increase or decrease the temperature to which the water is heated as required to maintain that temperature in excess of the temperature at which water is returned to the heater, by an approximately constant amount, and adjusting means for varying the said excess amount.

6. A controller adapted to regulate the heat supply to the heater of a hot water heating system and comprising in combination means adapted to respond to the temperature to which water is heated in said heater and tending to vary the heat supply to the heater as required to maintain said temperature constant, means adapted to respond to the temperature at which water is returned to the heater for reheating and operative to modify the action of the first mentioned means so as to increase the first mentioned temperature as the return water temperature increases above a predetermined value, and inoperative to modify the action of the first mentioned means so long as the return water temperature is below said value.

7. In a thermostatic controller as specified in claim 6, means for adjusting said abutment relative to said element and thereby varying the minimum force which said second mentioned means must exert on said spring to move the latter away from said abutment.

8. In a thermostatic controller as specified in claim 6, adjustable means limiting the extent to which the spring may be moved away from said abutment by an increase in the second controlling temperature.

WILLIAM WALTER TIMMIS.